United States Patent
Shahid et al.

(10) Patent No.: US 12,020,507 B2
(45) Date of Patent: Jun. 25, 2024

(54) SYSTEM AND METHOD FOR DETERMINING A FACIAL EXPRESSION

(71) Applicant: Centre for Intelligent Multidimensional Data Analysis Limited, Hong Kong (CN)

(72) Inventors: Ali Raza Shahid, Hong Kong (CN); Hong Yan, Hong Kong (CN)

(73) Assignee: Centre for Intelligent Multidimensional Data Analysis Limited, Hong Kong (CN)

( * ) Notice: Subject to any disclaimer, the term of this patent is extended or adjusted under 35 U.S.C. 154(b) by 345 days.

(21) Appl. No.: 17/514,548

(22) Filed: Oct. 29, 2021

(65) Prior Publication Data

US 2023/0142801 A1    May 11, 2023

(51) Int. Cl.
| | |
|---|---|
| *G06V 40/16* | (2022.01) |
| *G06N 3/04* | (2023.01) |
| *G06V 10/75* | (2022.01) |
| *G06V 10/82* | (2022.01) |

(52) U.S. Cl.
CPC ............ *G06V 40/174* (2022.01); *G06N 3/04* (2013.01); *G06V 10/751* (2022.01); *G06V 10/82* (2022.01); *G06V 40/162* (2022.01); *G06V 40/165* (2022.01); *G06V 40/171* (2022.01)

(58) Field of Classification Search
CPC .... G06V 40/174; G06V 10/751; G06V 10/82; G06V 40/162; G06V 40/165; G06V 40/171; G06V 10/761; G06V 10/774; G06V 10/764; G06N 3/04; G06N 3/044; G06N 3/0464; G06N 3/048; G06N 3/084
See application file for complete search history.

(56) References Cited

U.S. PATENT DOCUMENTS

| | | | | |
|---|---|---|---|---|
| 2017/0286759 | A1* | 10/2017 | Yao | G06V 40/164 |
| 2022/0138455 | A1* | 5/2022 | Nagano | G06T 5/006 |
| | | | | 382/118 |
| 2022/0139107 | A1* | 5/2022 | Cheng | G06V 10/82 |
| | | | | 382/181 |

OTHER PUBLICATIONS

Jung et al., "Joint Fine-Tuning in Deep Neural Networks for Facial Expression Recognition", 2015. (Year: 2015).*
Iandola et al., "SQUEEZENET: ALEXNET—Level Accuracy With 50X Fewer Parameters and <0.5MB Model Size", 2016. (Year: 2016).*
Bulat et al.. "How far are we from solving the 2D & 3D Face Alignment problem? (and a dataset of 230,000 3D facial landmarks)", 2017. (Year: 2017).*

* cited by examiner

*Primary Examiner* — Phuoc Tran
(74) *Attorney, Agent, or Firm* — MOSER TABOADA

(57) ABSTRACT

A system and method for determining a facial expression including a facial mask generator arranged to detect a plurality of facial points from one or more facial images to generate one or more associated facial point masks, arranged to represent the facial features of an associated face of the one or more facial images; and a learning network arranged to receive and input of the one or more facial images and the one or more associated facial point masks to obtain a classification result for each of the one or more facial images, wherein the classification result is one of a plurality of predefined facial expressions.

18 Claims, 8 Drawing Sheets

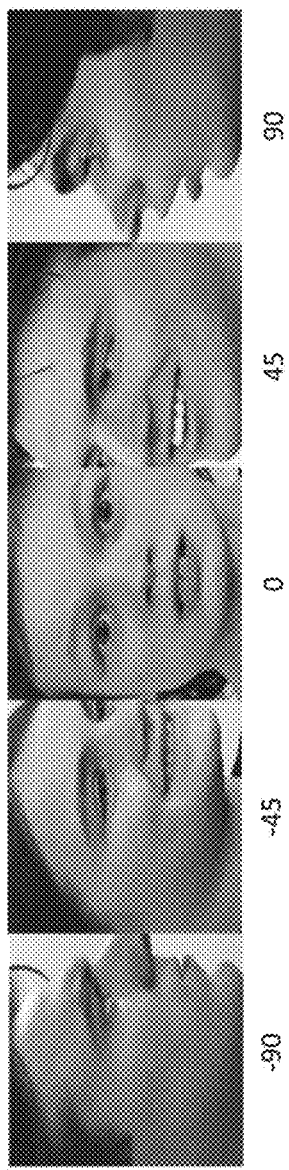
Figure 4
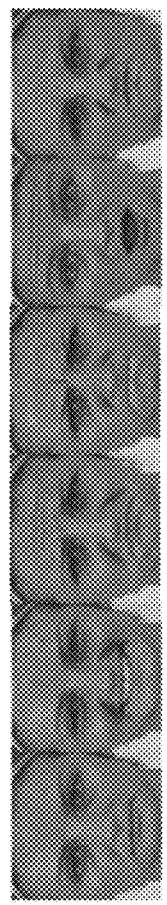
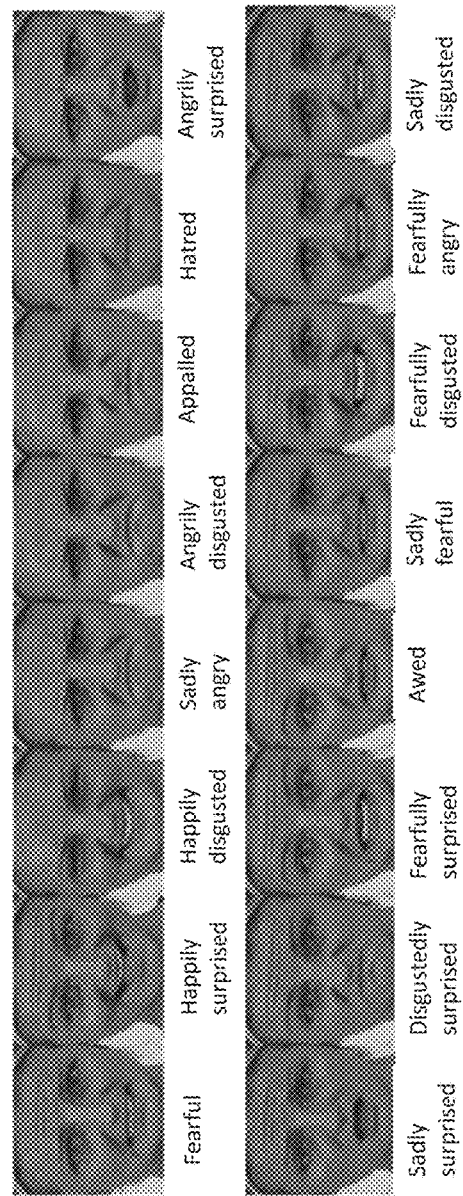
Figure 5

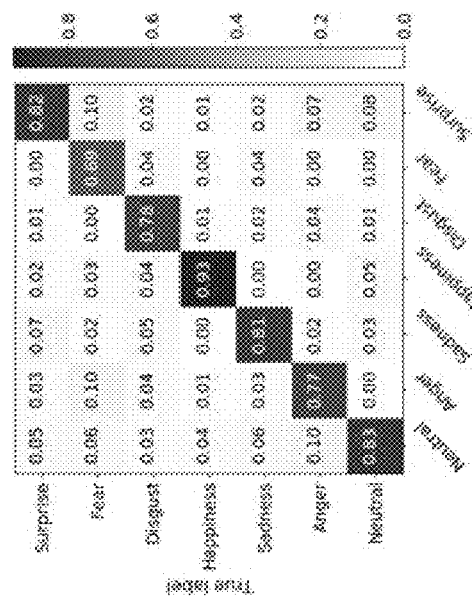
Figure 7c
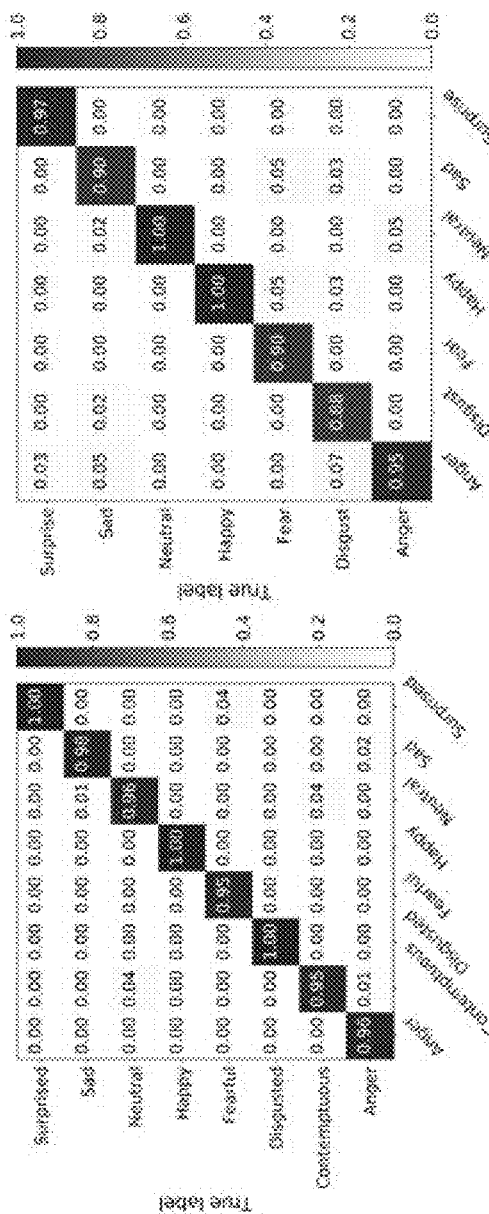
Figure 7b
Figure 7a

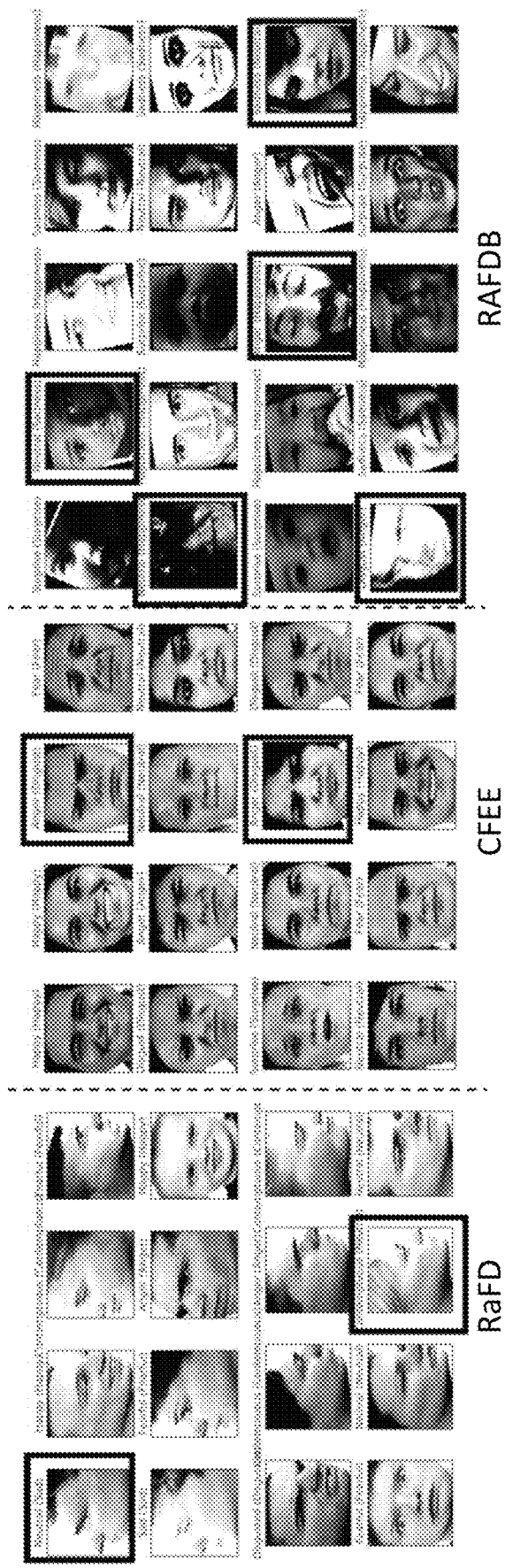
Figure 8c RAFDB
Figure 8b CFEE
Figure 8a RaFD

RaFD

CFEE

RAFDB

SYSTEM AND METHOD FOR DETERMINING A FACIAL EXPRESSION

TECHNICAL FIELD

The present invention relates to a system and method for determining a facial expression, and particularly, although not exclusively, to a system and method for determine a facial expression of a face as presented in an image.

BACKGROUND

Facial expressions are a universal signal that can show an emotion or agreement/disagreement and forms a significant part of nonverbal communications. Although human beings are able to interpret most facial expressions, it would be desirable for computer systems to be able to detect facial expressions too. This is particularly useful in certain industries such as marketing or security, where the facial expressions of a subject may determine a specific response.

With the popularity of computer vision or machine learning, various tools have been developed in an attempt to determine a subject's facial expressions. These techniques may include the processing of facial images with a machine learning network, such as a convolution neural network (CNN). However, despite such advancements, the detection of facial expressions has nonetheless been very difficult due to the complexity of such neural networks or the computational costs required to perform any meaningful determinations. As recognizing facial expressions may well be a function that must operate in real time to enhance communications between any two parties, the complexity and computation costs has meant such functions are difficult to be realized effectively.

SUMMARY OF THE PRESENT INVENTION

In accordance with a first aspect of the present invention, there is provided a system for determining a facial expression comprising:
  a facial mask generator arranged to detect a plurality of facial points from one or more facial images to generate one or more associated facial point masks, arranged to represent the facial features of an associated face of the one or more facial images; and
  a learning network arranged to receive and input of the one or more facial images and the one or more associated facial point masks to obtain a classification result for each of the one or more facial images, wherein the classification result is one of a plurality of predefined facial expressions.

In an embodiment of the first aspect, the system further comprises an augmentation processor arranged to augment each of the one or more facial images.

In an embodiment of the first aspect, the learning network has a squeezenet architecture.

In an embodiment of the first aspect, the learning network includes a dual stage structure, with each stage having at least one squeeze and expand block.

In an embodiment of the first aspect, the facial point mask is representative of the 3D geometrical and spatial facial information.

In an embodiment of the first aspect, the facial point mask is generated by multiplying the plurality of facial points by a plurality of associated weights, wherein the weights are determined based on the position of the pixel of the associate facial image relative to the distances from the facial point mask.

In an embodiment of the first aspect, the 3D geometrical and spatial facial information is a recurrent input for a classification module of the learning network.

In an embodiment of the first aspect, the classification module concatenates feature maps outputted by the dual stage structure.

In an embodiment of the first aspect, the classification ports a probability of each expression with a softmax function.

In an embodiment of the first aspect, the learning network includes a stem block arranged to downsample the input facial images.

In an embodiment of the first aspect, the system further comprise a face extraction processor arranged to extract a facial image from an input image.

In accordance with a second aspect of the invention, there is provided a method for determining a facial expression comprising the steps of:
  detecting a plurality of facial points from one or more facial images to generate one or more associated facial point masks, arranged to represent the facial features of an associated face of the one or more facial images; and
  inputting into a learning network the one or more facial images and the one or more associated facial point masks to obtain a classification result for each of the one or more facial images, wherein the classification result is one of a plurality of predefined facial expressions.

In accordance with an embodiment of the second aspect, the method further comprises an augmentation process arranged to augment each of the one or more facial images.

In accordance with an embodiment of the second aspect, the learning network has a squeezenet architecture.

In accordance with an embodiment of the second aspect, the learning network includes a dual stage structure, with each stage having at least one squeeze and expand block.

In accordance with an embodiment of the second aspect, the facial point mask is representative of the 3D geometrical and spatial facial information.

In accordance with an embodiment of the second aspect, the facial point mask is generated by multiplying the plurality of facial points by a plurality of associated weights, wherein the weights are determined based on the position of the pixel of the associate facial image relative to the distances from the facial point mask.

In accordance with an embodiment of the second aspect, the 3D geometrical and spatial facial information is a recurrent input for a classification module of the learning network.

In accordance with an embodiment of the second aspect, the classification module concatenates feature maps outputted by the dual stage structure.

In accordance with an embodiment of the second aspect, the classification ports a probability of each expression with a softmax function.

BRIEF DESCRIPTION OF THE DRAWINGS

Embodiments of the present invention will now be described, by way of example, with reference to the accompanying drawings in which:

FIG. 4 are RaFD sample facial expressions used in the test the learning network of FIG. 2;

FIG. 5 are CFEE sample facial expressions used to test the learning network of FIG. 2;

FIG. 7a is a confusion matrix of the learning network of FIG. 2 when RaFD dataset's facial expressions are applied to the learning network;

FIG. 7b is a confusion matrix of the learning network of FIG. 2 when CFEE dataset's facial expressions are applied to the learning network;

FIG. 7c is a confusion matrix of the learning network of FIG. 2 when RAFDB dataset's facial expressions are applied to the learning network;

FIG. 8a illustrates the correct classification and misclassified facial expressions for each of the facial expression datasets RaFD;

FIG. 8b illustrates the correct classification and misclassified facial expressions for each of the facial expression datasets CFEE;

FIG. 8c illustrates the correct classification and misclassified facial expressions for each of the facial expression datasets RAFDB;

DETAILED DESCRIPTION OF THE PREFERRED EMBODIMENT

Figure 1:
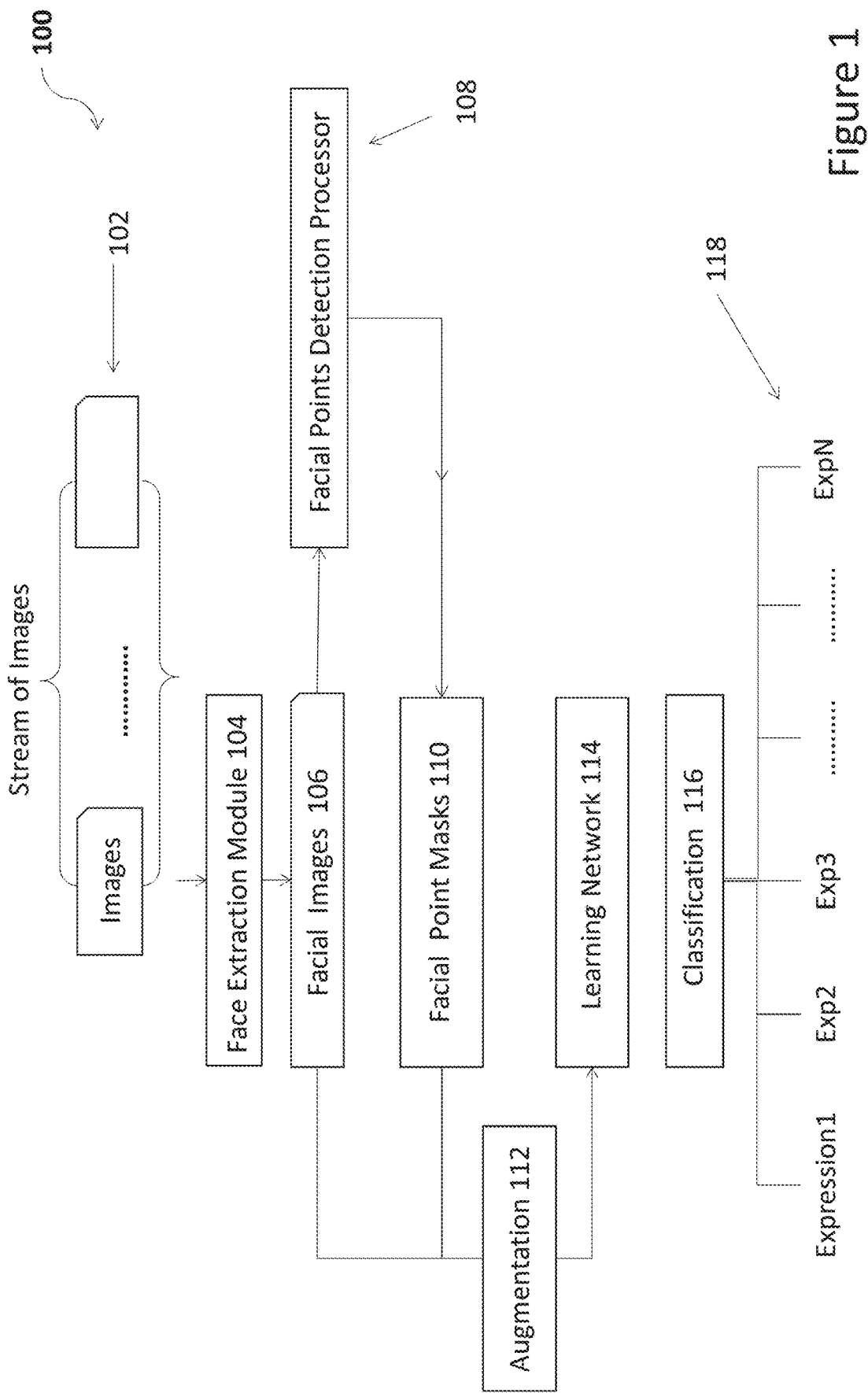
FIG. 1 is a block diagram of a system for determining a facial expression in accordance with one embodiment of the present invention.

Referring to FIG. 1, there is provided block diagram which illustrates an example embodiment of a system for determining a facial expression 100 comprising:
- a facial mask generator 108 arranged to detect a plurality of facial points from one or more facial images 102 to generate one or more associated facial point masks 110, arranged to represent the facial features of an associated face of the one or more facial images 102; and
- inputting into a learning network 114 the one or more facial images 102 and the one or more associated facial point masks 110 to obtain a classification result 116 for each of the one or more facial images 102, wherein the classification result 116 is one of a plurality of predefined facial expressions 118.

In a preferred embodiment, the system for determining a facial expression 100 further comprises an augmentation processor 112 arranged to augment each of the one or more facial features and/or a face extraction processor 104 where the images inputted into the system 100 are not limited to faces as subjects of the images, such that the face extraction processor 104 is arranged to crop or otherwise extract the face portion of the image 106 from the input images 102.

Example embodiments of the system for determining a facial expression 100 may be implemented on a computer, computer system or computing apparatus as software, hardware, or a combination of both on a computer or computing apparatus such as a computer, computer server, cloud server, portable computing devices, wearable devices, smart devices, Internet of Things (IOT) devices, smart phones, tablet computers or edge computing devices.

The computer or computing apparatus may comprise suitable components necessary to receive, store and execute appropriate computer instructions. The components may include a processing unit (CPU), Graphic Processing Unit (GPU), Math Co-Processing unit, read-only memory (ROM), random access memory (RAM), and input/output devices such as disk drives, input devices such as an Ethernet port/WiFi port, a USB port, etc. Display such as a liquid crystal display, a light emitting display or any other suitable display and communications links. The computer may also include instructions that may be included in ROM, RAM, cloud drives or disk drives and may be executed by the processing unit or GPU. There may be provided a plurality of communication links which may variously connect to one or more computing devices such as a server, personal computers, terminals, wireless or handheld computing devices, IoT devices, edge computing devices, cloud-based computer or computing services. At least one of a plurality of communications link may be connected to an external computing network through a telephone line, cellular connection or other type of communications link.

The computer or computing apparatus may include storage devices such as cloud storage services, a disk drive which may encompass solid state drives, hard disk drives, optical drives or magnetic tape drives. The computer may also use a single disk drive or multiple disk drives. The computer may also have a suitable operating system which resides on the storage devices, disk drive or in the ROM of the computer.

The computer or computing apparatus may also provide the necessary computational capabilities to operate or to interface with a machine learning network, such as a neural network, to provide various functions and outputs. The neural network may be implemented locally, or it may also be accessible or partially accessible via a server or cloud-based service. The machine learning network may also be untrained, partially trained or fully trained, and/or may also be retrained, adapted or updated over time.

In this embodiment, the system for determining a facial expression 100 is firstly arranged to receive images 102 from an image source. Such images may be a single image or it may be a plurality of images from a stream of images such as a video or surveillance motion pictures as captured from a camera. There are no specific limitations as to what the images may present, and therefore, the images may be of any objects or items, in any lighting or orientations, or that the images may even be artworks in the form of a painting, drawing or rendering. Preferably, for the operation of the system for determining a facial expression 100, it is preferred that there is at least one image with a face within it such that a face within the at least one image 102 may be processed, classified and have its facial expression determined by the system for determine a facial expression 100. It is also important to note that the face need not be a human face, but could be the face of an animal, or even an animated face such a cartoon characters or artworks, or may also be a personification of an inanimate object such as an object that has been anthropomorphized. Examples of this may include the facial expressions of houses, cars or planes as seen in animated films or artworks.

Once the images 102 are inputted into the system 100, a facial extraction module 104 is arranged to receive the images 102 so as to extract one or more faces from the images. As described above, the images 102 may include various items or objects, and thus it is possible that there is a face captured within the image, but also the background or other segments and objects may also be within the image. Accordingly, in order to improve the performance of the system for determining a facial expression, the faces are firstly extracted into a facial image 106, although this may not be necessary in certain applications where the input images 102 are already sorted to only include faces as its main subject. As it will be explained below with reference to FIG. 3, this may be performed with a face detection neural network available in computer vision libraries or tools such as OpenCV.

The facial extraction module 104 may then create a facial image 106 which will be based on a portion of the images 102 that will show a face. The facial image 106 is then passed to a facial points detection processor 108, which is arranged to generate a facial point mask 110. The facial point mask 110, which will be explained further below with reference to FIGS. 2 and 3, is in an example embodiment, a mask which includes a combination of points of the facial features of the face, processed with specific weights, such that it can better draw attention to the facial features when the inputs are made to the subsequent learning network 114.

In this way, the mask 110 operates as a geometrically weighted 3D face-point mask that creates the attention mechanism and augments 112 spatially, the associated face image when the face image 106 and the mask 110 is inputted and propagated within the learning network 114. As it will be explained with reference to FIGS. 2 and 3, the computed facial point mask 110 may be a 3D face point mask which is element-wise multiplied with the associated input image 106 based on a weight function. Preferably, the weight function compares the associated input image 102 and the mask 102 using the Euclidean distance space, then assigns a weight to the corresponding pixel. In turn, this process may be applied to several layers in the subsequent learning network 114 to highlight the local facial features more efficiently and allow the learning network to perform a more accurate classification 116 process of the facial expressions 118 for output. Additionally, as it will be shown with reference to FIG. 2, a recurrent layer block may also be utilized to preserve the spatial and facial points feature information to ensemble the learning network's 114 dual stages.

Figure 2:
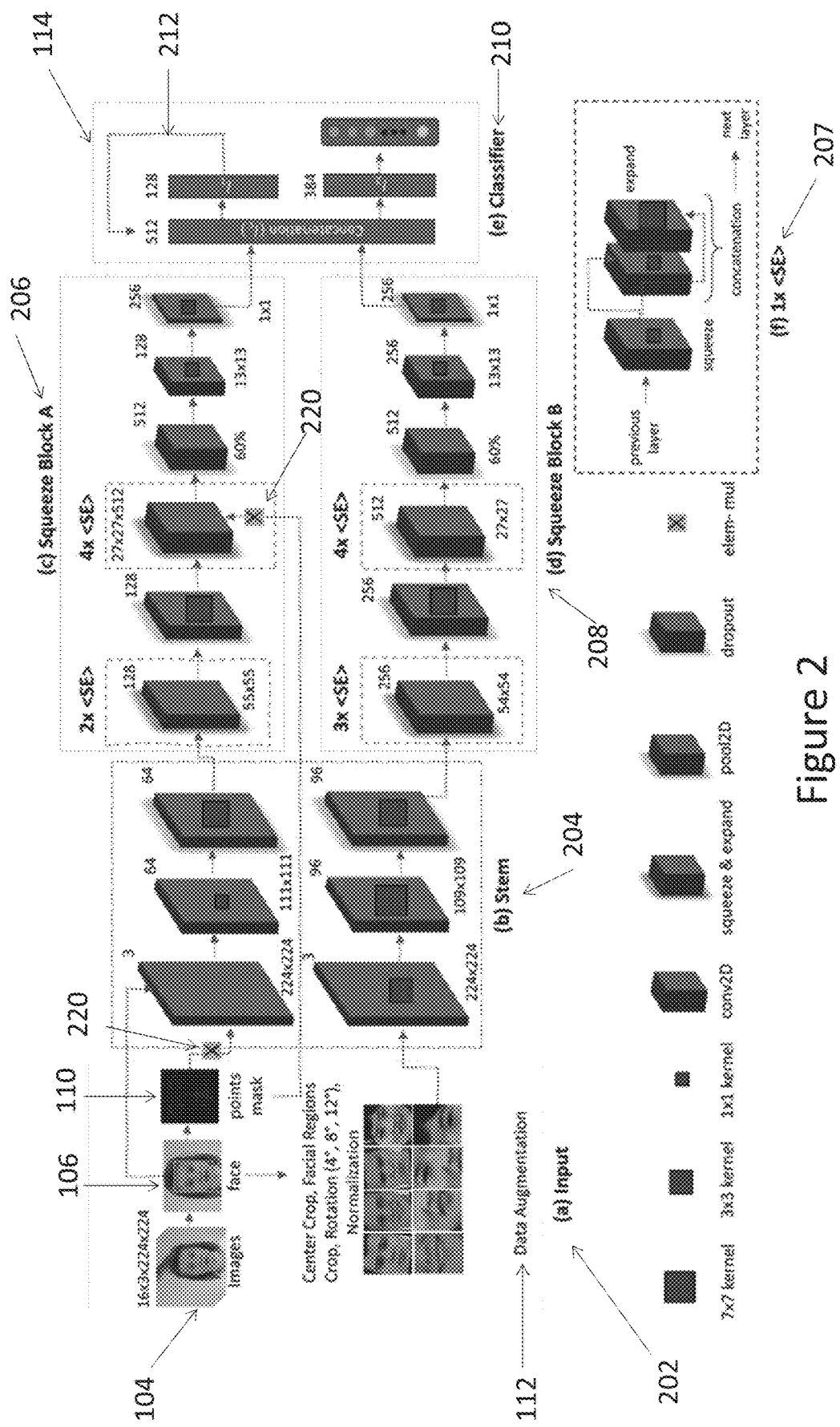
FIG. 2 is a block diagram of an example framework of a learning network used in the system for determining a facial expression of FIG. 1.
Figure 3:
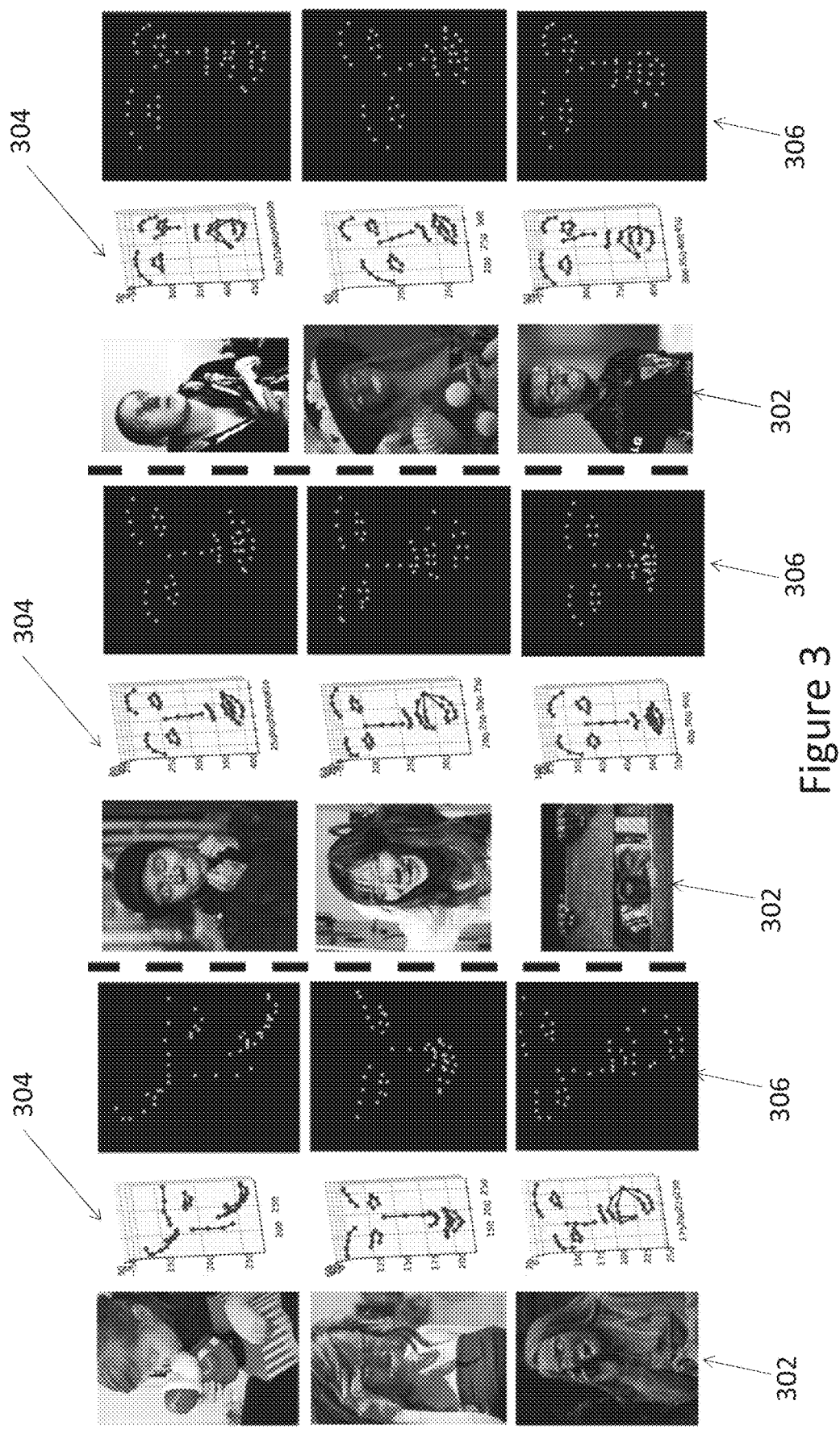
FIG. 3 are illustrations of the facial images, and their respective 3D face points and face point masks as generated by a facial points detection processor of the system for determining a facial expression of FIG. 1.

With reference to FIG. 2, there is illustrated an example of the system for determining a facial expression with the learning network 114 being shown with its structure or framework. In this embodiment, the learning network 114 is divided into several parts, including: input 202, stem 204, dual-squeeze and classification block 206, 208 respectively. In this example embodiment, the (a) Input block 202 represents the face and face points detection along with the data augmentations and points mask 110. The (b) Stem block 204 used for downsampling the input facial image for the subsequent dual stages 204/206/208. The (c) Squeeze block A 206 and (d) B 208 consist of several Squeeze & Expand (SE) blocks 207, convolutions, pooling and dropout layers. The (e) classifier block 210 concatenates pooled results from the dual-stages and ports the probabilities for scores using, in this example, a softmax layer, and (f) the SE block 207, shown in more detail, as recursively used in Squeeze Block A 206 and B 208 (Nx times).

In this example, the input block 202 is arranged for facial images 104 to be taken from the datasets to detect face and facial points. The aligned face image 106 and the separated facial point mask 110 prepared for the squeeze block A 206 and stem 204. Besides the first stage of squeeze block, the augmentation 112 may also be performed for the same input image 104 and branched to the second stage 204/208.

It follows that in this example, the stem block 204 is used to downsample the input data for retaining the highlevel features at both squeeze block stages 206, 208. The geometry component incorporates 3D facial points in the network to achieve a more accurate recognition. The last component of the network 114 utilizes a recurrent stacked input unit 212 to assemble enhanced feature maps from the squeeze blocks 206, 208 with the final classification 210 of facial expression by a fully connected layer associated with a softmax function. To illustrate one example of the learning network's 114 operation with mathematical notation, let's assume input facial image is denoted by I, its duplicates for the detected face as F, and facial points as P, and crops as $F_1, F_2, \ldots, F_k$ along with facial points $P_1, P_2, \ldots, P_m$ with the backbone CNN as $f(x, y)$. The facial feature set X is defined by:

$$X=[I_0, I_1, \ldots, I_k]$$

$$X=[f(F_0;P_0), f(F_1;P_1), f(F_k;P_m)] \qquad (1)$$

where k and m are the number of face and face points set. The dimensions of input facial images are fixed, cropped, and aligned 3D face points extracted using a face landmarks detection method (such as Bulat and Tzimiropoulos 2017). Then the tensor of the batch (16) of faces in the input is rescaled to 16×3×224×224 using bicubic interpolation for 3 number of channels as a rectilinear grid. The input tensor is normalized to its mean and standard deviation to standard input to the network. The sequence of means for each channel is μ=[0.485, 0.456, 0.406], and standard deviations is σ=[0.229, 0.224, 0.225], which is set after number of different trials. Moreover, center crop, facial regions crop transforms are applied to obtain our network's augmented data. These transforms are applied to augment the data as different local facial regions, mainly define different facial expressions. A constraint on cropping within the face (as shown in FIG. 2, 106) enforces that weights are from local regional areas within the face e.g., mouth, eyes and nose. Rotations from different angles [−12, −8, −4, 0, 4, 8, 12] are applied. The 3D face points are utilized to construct a face point mask 110 described below. The augmented images 112 are scaled at same image dimensions as input image with a shape of 3×224×224.

Preferably, face points are used to differentiate the importance of the main facial components, e.g., mouth, eyes and nose, from other parts of the face that are less expressive. A similar approach (such as those described in Jaiswal and Valstar 2016) used different shapes around the face through a binary mask for the Convolution Neural Network (CNN) to recognize AU's as feature extraction, followed by Long Short Term Memory. The existing approaches may not preserve the uncontrolled face poses and thus demonstrating a difference between existing Facial Expression Recognition systems (FERs), and the embodiments of the system for determining a facial expression 100 since the various poses are preserved using 3D face points of texture and geometry, followed by recurrent input 212 in an end-to-end network 114. In this implementation, the 3D face points may be incorporated by placing the element-wise multiplicative layer unit in the stem 204 and Squeeze block 206 by multiplying face points 304 by the input tensor as illustrated in FIG. 3, which shows that in the first column, fifty-one landmarks detected from a facial image 302 and the middle column the 3D face landmarks 304 and the third column shows the face point mask 306.

In this embodiment, the faces from images may be extracted using OpenCV, a face detection neural network with high accuracy in real-time to obtain the bounding boxes of faces by the caffe model, at a confidence level>70%. 2D-3D-FAN (as described in Bulat and Tzimiropoulos 2017) is a face alignment method used to localize the face points via a residual block, where a DCCN converts 2D annotations to 3D. Preferably, as is the case in this example implementation, Fifty-one face points from facial images with heavy poses, low illumination and occlusions are extracted.

Face points mask filters are in turn generated for each face image for the training phase using the weight function. The mask 110 for each facial image is resized to their layer size in the network. Extracted fifty-one face points determine the dimensions of the face geometry feature as, $P_m$, $m_{ijk}$= {1, ..., 51}, $x_i$, $x_j$, where i≠j≠k, $X(P_m)=(x_{i1}, x_{j1}, x_{k1})^T$, $x_{i1}$, $x_{j1}$ and $x_{k1}$ are the vertical, horizontal and depth components, respectively, of the face points, and their relative positions are $r_P = x_{im} - x_{jm} - x_{km}$. The face points for each face image are converted to a binary mask and all images are resized to the size of the layer in the network. Weights are applied to all pixels in an image based on their distances from the face point mask, with greater weight given to closer pixels. Several distance measures were considered by the inventors in their trials and experiments, but better recognition was obtained from the Euclidean distance ($L^2$) with a linear weight function multiplied element-wise with the input face image (Equation 2).

$$w(P_m^n, F_k^n) = L^2(P_m^n, F_k^n) \qquad (2)$$

where $L^2$ is the Euclidean distance between face point $P_m$ and image $F_k^n$, n corresponds to the pixel location. In turn, pixels will have proportionally lower weights the farther they are from the corresponding facial point. The weighted mask used in the stem block 204 replaces the input layer of the original SqueezeNet with an element-wise multiplication 220 of the weight function w and input layer $i_L$:

$$f'\{o_L = i_L \times w(P_m^n, F_k^n)\} \qquad (3)$$

where $i_L$ and $o_L$ are the input and output of the L-th layer, and $f'$ is the activation function. A similar elementwise multiplication 220 is also used to squeeze block A 206 by introducing an additional layer in the learning network 114 to achieve adequate attention. This method introduces the attention mechanism to the learning network 114.

The SqueezExpNet architecture, which is slightly shallower than the original baseline SqueezeNet architecture, results from investigating variations of the Squeeze module and achieved better recognition rates over several datasets. As shown in FIG. 2, the structure of SqueezExpNet has in this example an input size of 16×3×224×224 (16 the tensor size, three color channels, 224×224 facial image size). There are two parallel input lines to the model, one for geometry and one for texture feature maps. The stem block 204 is used to downsample the input block images and retain the high-level image features.

In this example, the stem block 204 includes two convolution layers followed by a 2D pooling layer. The geometry-based convolution layer has a lesser depth (16×111×111×64) than the texturebased convolutional layer (16×109×109×96). Squeeze blocks A 206 and B 208 follow stem unit 204 and consist of squeeze & expand 207, pooling, dropout, and convolution layers. As shown in this implementation, all convolution layers are followed by a ReLU activation function to avoid the vanishing gradient problem. The squeeze block A 206 and B 208 the image from stem block 204 is preferably down samples to 13×13 with increase in depth to 128 and 256. In Squeeze Block A 206, the network focuses solely on the pixels defining facial expressions, resulting in sharper and more precise attention to the critical region of facial images, optimizing high-level geometric position knowledge of the nonattention field in the local image.

As described earlier, to capture the geometry along with the texture of the resulted feature map from the dual stages and these relationships into account for classifying the facial expression in the softmax layer, recurrent input 212 layers are used. The feature maps from the Squeeze blocks enter a classifier unit after a "pool2D layer" of sizes 128 and 256. Then a recurrent input 212 classifier 210 concatenates the dual-stage feature maps. The traditional one-to-one type recurrent block is used as $T_x = T_y = 1$ as in Equation 4 using three linear layers and a softmax (σ) layer.

$$l_{1n} = W_{l_1} x_n + U_{l_1} y_{n-1} + b_{l_1}$$

$$y_n = \sigma_{l_2}(W_{l_2} l_{1n} + b_{l_2}) \qquad (4)$$

where x, y as input and output, n is the number of iterations during the forward and backward propagation, W, U and b are parameter matrices and vector. $U_{l_1}$ is initialized by zero value during the training process and then taken as a state layer because it has recurrent connections themselves.

For the classification 210 of still images, 128 hidden units for recurrent input were found to be effective for facial expression recognition. A recurrent input 212 stack captures the trend in spatial and geometric changes in the classifier 210, while a recurrent input classifier manages problems with gradients to improve the accuracy. In the final stage. the normalized exponential function may be used in the softmax layer $\sigma: \mathbb{R}^C \to \mathbb{R}^C$ to have a probability distribution over predicted output expression class (Equation 5).

$$\sigma_{l_2} = \frac{e^{l_2}}{\sum_{j=1}^{C} e^{l_{2j}}} \text{ for } i = (1, \ldots, j) \in \mathbb{R}^C \qquad (5)$$

where C is the total number of expression classes.

In implementing the system for determining a facial expression 100, the learning network 114 is preferably trained, and thus during the training process, it was found that multi-margin loss can minimize intra-class variations and simultaneously expand inter-class gaps. The network 114 may be trained using a multi-margin loss ($\mathcal{L}_{mml}$) optimization function, on a multi-class classification margin loss between the input x tensor batch and the output y tensor batch of a target class. For individual batch samples, the loss function is defined by Equation 6, with losses for every batch averaged over each loss element.

$$\mathcal{L}_{mml}(x, y) = \frac{\sum_{i=1}^{n} \max(0, w[y] * (\text{margin} - x[y] + x[i])^2}{x. \text{ size } (0)} \qquad (6)$$

where margin has a value of 1 and w is the non-equal weighting of the classes as the RaFD (Langner et al. 2010) and RAFDB (Li and Deng 2019) datasets contain imbalanced numbers of samples over expressions classes. Weight decay, where weights are multiplied by a factor slightly less than 1 after each update prevents the weights from growing too large. This configurable hyperparameter, as used in training typically ranged from 0.0001 to 1.0. For every batch step n, the derivative of the loss $\mathcal{L}_{mml}$ with respect to the weight w could be expressed as in equation 7.

$$\frac{\partial \mathcal{L}_{mml}^n}{\partial w} = \sum_{i=1}^n \frac{\partial \mathcal{L}_{mml}^n}{\partial w}\Big|_i \qquad (7)$$

Storing the previous w may be insufficient for the next best weight computation during the forward and backpropagation. An adaptive learning rate method (2015) (ADADELTA) may then be used to optimize the network 114 during the training process. This dynamically changes the learning rate and is robust to noisy gradients, which reduces computational load. A multi-step learning rate may then be incorporated to decay the learning rate when the number of epochs reach a certain level and reach a suitable milestone, e.g., 35, 75. The ADADELTA decaying process accumulates as an exponential average of the squared gradients ($g^2$). Assume at epoch n the running average is $S(g^2)_n$ then as computed in equation 8.

$$S(g^2)_n = \rho S(g^2)_{n-1} + (1-\varphi)g^2 \qquad (8)$$

where $\rho$ is the decaying constant. Running average mean of the squared gradient updates the previous squared gradient as in equation 9.

$$RMS(g)_n = \sqrt{S(g^2)_n} \qquad (9)$$

Then the output parameter accumulates the current and previous gradients as in equation 10.

$$\Delta g_n = -\frac{1/RMS(g)_{n-1}}{RMS(g)_n}(g)_n \qquad (10)$$

Optimizing the gradients may make the training process robust to large sudden gradients and in turn reduces the effective learning rate at the current epoch. The numerator term in equation 8 acts as an acceleration term by accumulating the previous gradient term over the current gradient. To keep a similar standard, it was demonstrated to use 100 epochs during the network's training process on facial expression datasets using dual-stage SqueezExpNet architecture. The proposed method was trained with a configuration of the Pytorch1.2.0 platform on Ubuntu 20.0464-bit. The hardware used for the experimental environment was in this example an Intel Core i7-7800 CPU @ 3.50 GHz×12 processors, 64 GB of RAM, and 2× Nvidia GTX 1080 GPUs.

In one example implementation, the trained system for determining a facial expression was evaluated on the CFEE (Du et al. 2014), RaFD (Langner et al. 2010), and RAFDB (Li and Deng 2019) databases with still images.

RaFD is set of 67 identities displaying eight expressions including Moroccan Dutch males, Caucasian children, boys and girls both. There are 8010 images with eight emotional expressions, happy, angry, sad, contemptuous, disgusted, fearful, surprised and neutral collected with the FACS (Facial Action Coding System) coder. To generalize to real-world scenarios each expression is collected in three gaze directions as shown in FIG. 4, with the subject looking left, front and right without changing head orientation and taken from five different camera angles (−90, −45, 0, 45, 90) simultaneously. The frontal pose is taken as the reference at zero degrees The CFEE dataset has 5040 images from 230 subjects. There are six basic emotional expressions and neutral. As physiologists believe that the human system uses more than basic facial expressions, the database also contains fifteen compound emotion categories. For example, the happily surprised expression is activation of happiness and surprised concurrently. As shown in FIG. 5, the images are equally distributed among the basic and compound expressions for twenty-two classes.

Figure 6:
FIG. 6 are RAFDB sample facial expressions used to test the learning network of FIG. 2.

The RAFDB dataset contains 30,681 facial images with basic and compound expressions annotated by 40 trained human coders. This dataset is composed of images collected from social media and is highly variable in terms of gender, age, ethnicity, head poses and occlusions. The subjects are up to 70 years old with 52% female, 43% male and 5% of unclear gender. 15% are of Asian, 8% of African American, and 77% of Caucasian ethnicity. There are six basic expressions and the compound facial expressions happily surprised, happily disgusted, sadly fearful, sadly angry, sadly surprised, sadly disgusted, fearfully angry, fearfully surprised, angrily surprised, angrily disgusted, disgustedly surprised. The compound category contains 3162 training samples and 792 testing samples after alignment. Sample images are shown in FIG. 6 after performing the face alignment. In the experiments, 23,727 basic emotion images were used as training data and 3,000 images as test data.

After detecting faces, 51 facial points are extracted by a 3D face alignment network based on a residual block method (Bulat and Tzimiropoulos 2017). Detected faces are resized to 224×224 pixels. Larger image sizes will enable a deeper network with more abstract features. The network settings and layer sizes are shown in FIG. 2. The network is trained separately for each dataset (RaFD, CFEE, RAFDB). Accuracy was evaluated over a range of training parameters and the best results are reported.

In this example, three different sets of experiments were conducted to evaluate this implementation of the system for determining a facial expression; the basic expression recognition task, compound expressions and cross-dataset performance.

Each database was split into training, validation, and testing sets in a subject independent manner. The detail specification of each layer is described in FIG. 2. Various kernel filter sizes, strides, and activations have been investigated and the one that had the best performance is presented in this paper. The recognition rates achieved on each database and the comparison of SqueezExpNet with state-of-the-art methods is shown in

TABLE 1

Results from SqueezExpNet without the face point mask element wise multiplication unit (it is replaced with a simple connection between the previous and next layer units), its "2D" form, are also shown.

| CNN Mode | Accuracy | | |
|---|---|---|---|
| | RaFD | CFEE | RAFDB |
| AlexNet (Krizhevsky et al. 2017) | 80.49 | 66.36 | 70.32 |
| ResNet-50 (He et al. 2016) | 82.75 | 85.14 | 52.40 |
| RAN (Wang et al. 2020) | 83.45 | 56.47 | 51.01 |
| JFDNN (Jung et al. 2015) | 79.86 | 71.96 | 63.71 |

TABLE 1-continued

Results from SqueezExpNet without the face
point mask element wise multiplication unit
(it is replaced with a simple connection
between the previous and next layer units),
its "2D" form, are also shown.

| CNN Mode | Accuracy | | |
|---|---|---|---|
| | RaFD | CFEE | RAFDB |
| SqueezeNet (Iandola et al. 2016) | 90.63 | 89.19 | 61.91 |
| SqueezExpNet★ (ours) | 95.23 ± 1.19 | 91.11 ± 1.84 | 71.52 ± 2.30 |
| SqueezExpNet† (ours) | 96.30 ± 1.89 | 92.63 ± 2.91 | 74.11 ± 1.01 |
| SqueezExpNet (ours) | 97.12 ± 1.58 | 93.85 ± 1.64 | 80.65 ± 1.43 |

★The architecture without 3D face points mask
†Accuracy directly from output by Squeeze Block A & B using linear layer Table 1, Recognition Rates in %

Furthermore, experiments were also performed without using the recurrent input classifier and instead the classifier block was replaced with a simple linear layer to concatenate the dual stages of Squeeze Block A 206 and B 208. In this experiment, the baseline SqueezeNet did not contain the softmax layer for the classification, it uses the "adaptivepool2D layer". In turn, the SqueezExpNet without a recurrent input-based classifier block by replacing it with a linear layer was also investigated, and based on the inventor's observations, SqueezExpNet shows considerable improvements in the accuracy of FER (Table 1). The element-wise incorporation of face points gives a greater improvement on the real-world images of the RAFDB database than the lab posed images of the CFEE and RaFD databases. Also, the recurrent based-input classifier helps to improve the accuracy of dual-stage SqueezExpNet.

Comparing to other state-of-the-art works, example implementations of the learning network 114 outperforms other FER systems in RaFD and CFEE databases while achieves comparable results in RAFDB dataset (Table 1). Most existing methods use a pre-trained network tuned for a specific database, while SqueezExpNet settings are the same for all databases. Due to the limited number of samples in most databases, it is challenging to train a deep network while avoiding problems like overfitting, bias and vanishing gradients. For these reasons and order to have better understanding about in this proposed learning network 114, the inventors had also experimented the compound categories in facial expressions.

Figure 9A:
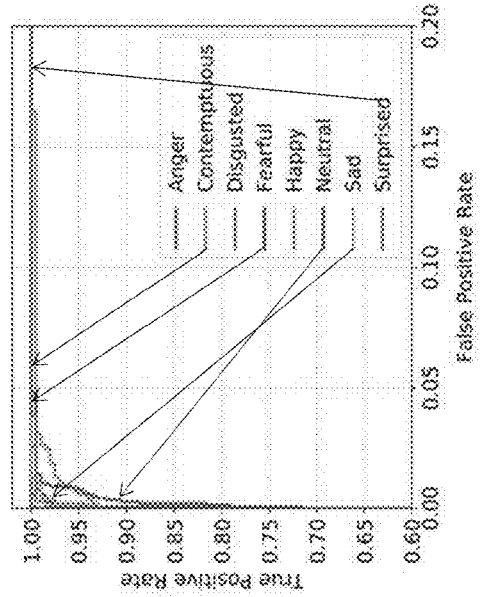
FIG. 9a illustrates the receiver operating characteristics (ROC) curve of the learning network using the RaFD datasets.
Figure 9B:
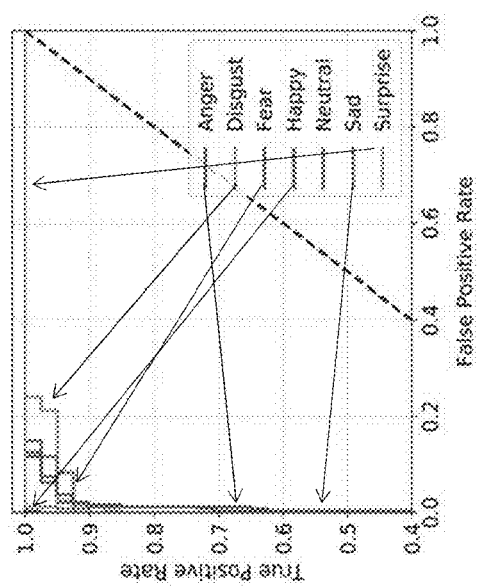
FIG. 9b illustrates the receiver operating characteristics (ROC) curve of the learning network using the CFEE datasets; and, FIG. 9c illustrates the receiver operating characteristics (ROC) curve of the learning network using the RAFDB datasets.
Figure 9C:
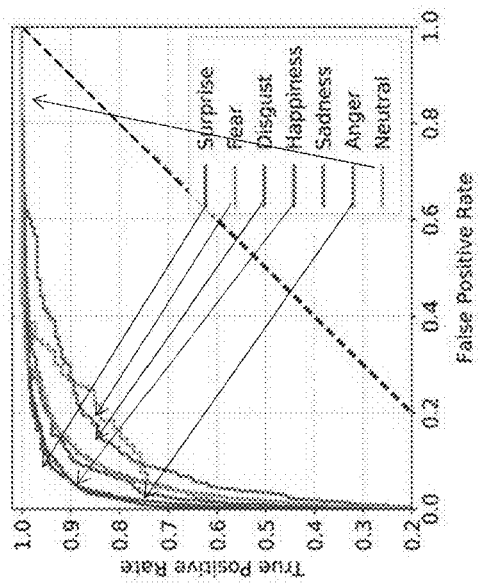

FIG. 7 shows the resulting confusion matrices of SqueezExpNet with weighted mask on different databases for basic expression recognition rates. On RaFD (FIG. 7a), a very high recognition rate is achieved, with surprise, disgusted and happy higher than the others. The highest level of confusion is between contemptuous and neutral due to the resemblance in these expressions in a side posed face. The prediction of expression classes using RaFD dataset is illustrated in FIG. 8a (misclassifications are indicated with squares). The receiver operating characteristic (ROC) curve on SqueezExpNet model using RaFD dataset eight classes is illustrated in FIG. 9a. On CFEE (FIG. 7b), a higher recognition rate is achieved for the happy and neutral expression. The disgust is confused with the anger (7%), happy (3%) and sad (3%) expressions. The predictions of expressions are illustrated in FIG. 8b for example, the misclassified case of anger with disgust. In FIG. 9b, the computed ROC curve for SqueezExpNet model is illustrated for basic categories in CFEE dataset. On RAFDB (FIG. 7c), the highest and lowest recognition accuracies are achieved by happiness and fear, respectively. This level of confusion is reasonable considering that RAFDB is a highly imbalanced database, and this has biased the network towards the disgust and fear expression categories. Some of the real-world images are highly occluded with, for example, beard or makeup on face (FIG. 8c). Despite the low number of images in disgust and fear in RAFDB database, the most difficult expressions to identify among all the databases, SqueezExpNet is able to achieve better recognition rates relative to other methods (FIG. 9c). Happy and surprise are the only expressions that were more recognized across all the databases, and their misclassification rate is lower than rest of the expression classes (FIG. 7a-c). Some failure and success cases are illustrated in FIG. 8a-c which are obtained separately using the trained SqueezExpNet model on testing sets.

To classify compound expressions the CFEE and RAFDB datasets were used with the basic expression categories removed for some experiments. The mean diagonal values in the confusion matrix of the 15 classes for the CFEE dataset show the best classification is achieved for the happily disgusted and angrily surprised expressions (Table 2) with the least accuracy (72.9%) achieved for the appalled expression. For an overall accuracy of 84.58% while using the compound expressions. The RAFDB dataset compound expressions were also considered and SqueezExpNet model achieved an average accuracy of 65.26% over the 11 accessible classes (Table 3).

TABLE 2

Confusion matrix for compound categories when using SqueezExpNet on the CFEE database.

| % | a | b | c | d | e | f | g | h | i | j | k | l | m | n | o |
|---|---|---|---|---|---|---|---|---|---|---|---|---|---|---|---|
| a | 87.5 | 0.0 | 2.1 | 0.0 | 4.2 | 0.0 | 0.0 | 0.0 | 6.3 | 0.0 | 0.0 | 0.0 | 0.0 | 0.0 | 0.0 |
| b | 0.0 | 100.0 | 0.0 | 0.0 | 0.0 | 0.0 | 0.0 | 0.0 | 0.0 | 0.0 | 0.0 | 0.0 | 0.0 | 0.0 | 0.0 |
| c | 0.0 | 0.0 | 83.3 | 2.1 | 0.0 | 0.0 | 2.1 | 0.0 | 0.0 | 0.0 | 6.3 | 0.0 | 4.2 | 0.0 | 2.1 |
| d | 2.1 | 0.0 | 2.1 | 77.1 | 2.1 | 2.1 | 2.1 | 12.5 | 0.0 | 0.0 | 0.0 | 0.0 | 0.0 | 0.0 | 0.0 |
| e | 0.0 | 2.1 | 0.0 | 2.1 | 87.5 | 2.1 | 2.1 | 2.1 | 0.0 | 0.0 | 0.0 | 0.0 | 0.0 | 2.1 | 0.0 |
| f | 2.1 | 0.0 | 0.0 | 0.0 | 2.1 | 68.8 | 0.0 | 2.1 | 0.0 | 6.3 | 0.0 | 4.2 | 0.0 | 14.6 | 0.0 |
| g | 2.1 | 0.0 | 0.0 | 0.0 | 2.1 | 4.2 | 75.0 | 0.0 | 12.5 | 0.0 | 0.0 | 4.2 | 0.0 | 0.0 | 0.0 |
| h | 4.2 | 0.0 | 2.1 | 2.1 | 0.0 | 0.0 | 0.0 | 81.3 | 0.0 | 2.1 | 0.0 | 0.0 | 4.2 | 0.0 | 4.2 |
| i | 2.1 | 2.1 | 0.0 | 4.2 | 0.0 | 0.0 | 0.0 | 0.0 | 83.3 | 0.0 | 0.0 | 0.0 | 6.3 | 0.0 | 2.1 |
| j | 0.0 | 0.0 | 0.0 | 0.0 | 0.0 | 2.1 | 0.0 | 0.0 | 0.0 | 97.9 | 0.0 | 0.0 | 0.0 | 0.0 | 0.0 |
| k | 0.0 | 2.1 | 0.0 | 0.0 | 2.1 | 0.0 | 0.0 | 0.0 | 0.0 | 0.0 | 93.8 | 0.0 | 2.1 | 0.0 | 0.0 |
| l | 0.0 | 0.0 | 0.0 | 2.1 | 0.0 | 0.0 | 2.1 | 2.1 | 0.0 | 0.0 | 0.0 | 93.8 | 0.0 | 0.0 | 0.0 |

TABLE 2-continued

Confusion matrix for compound categories when using SqueezExpNet on the CFEE database.

| % | a | b | c | d | e | f | g | h | i | j | k | l | m | n | o |
|---|---|---|---|---|---|---|---|---|---|---|---|---|---|---|---|
| m | 0.0 | 0.0 | 0.0 | 4.2 | 0.0 | 0.0 | 10.4 | 0.0 | 0.0 | 0.0 | 2.1 | 2.1 | 72.9 | 0.0 | 0.0 |
| n | 0.0 | 0.0 | 4.2 | 2.1 | 2.1 | 2.1 | 2.1 | 0.0 | 0.0 | 0.0 | 0.0 | 2.1 | 0.0 | 85.4 | 0.0 |
| o | 0.0 | 2.1 | 2.1 | 0.0 | 0.0 | 0.0 | 2.1 | 6.3 | 4.2 | 2.1 | 0.0 | 0.0 | 0.0 | 0.0 | 81.3 | a: Happily surprised,
b: Happily disgusted,
c: Sadly fearful,
d: Sadly angry,
e: Sadly surprised,
f: Sadly disgusted,
g: Fearfully angry,
h: Fearfully surprised,
i: Fearfully disgusted,
j: Angrily surprised,
k: Angrily disgusted,
l: Disgustedly surprised,
m: Appalled,
n: Hatred,
o: Awed.

TABLE 3

Confusion matrix for compound categories when using SqueezExpNet for RAF-DB database.

| % | a | b | c | d | e | f | g | h | i | j | k |
|---|---|---|---|---|---|---|---|---|---|---|---|
| a | 71.1 | 3.3 | 0.8 | 0 | 0 | 0.1 | 9.4 | 1.5 | 4 | 4.5 | 5.3 |
| b | 11.2 | 69.5 | 0 | 1.3 | 2.1 | 0 | 5.5 | 6.9 | 0.7 | 1.9 | 0.9 |
| c | 3.5 | 1.2 | 42.9 | 23.8 | 0 | 2.1 | 9.8 | 0.8 | 4.5 | 7.8 | 3.6 |
| d | 0 | 7.4 | 4.4 | 63.8 | 8.6 | 1.1 | 0 | 4.8 | 1.9 | 8 | 0 |
| e | 0 | 2 | 2.8 | 1.7 | 73.5 | 0 | 6.4 | 1.1 | 0.4 | 9.8 | 2.3 |
| f | 4.1 | 0 | 0 | 6.8 | 8.9 | 61.4 | 15.4 | 3.2 | 0 | 0.2 | 0 |
| g | 5.6 | 0.8 | 3.2 | 1.1 | 6.3 | 0 | 65.8 | 1 | 15.1 | 1.1 | 0 |
| h | 21.1 | 0.5 | 0 | 8.7 | 0 | 6.1 | 0 | 60.7 | 0 | 2.9 | 0 |
| i | 9.8 | 0 | 6.1 | 0 | 0 | 5.5 | 2.5 | 10.8 | 61.1 | 4.2 | 0 |
| j | 1.1 | 3.5 | 0 | 1.4 | 3.6 | 1.1 | 4.9 | 0.8 | 4.5 | 77.2 | 1.9 |
| k | 1.7 | 0 | 0.8 | 1.1 | 1.6 | 0.4 | 6 | 7.9 | 1.6 | 8.1 | 70.8 | a: Happily Surprised, b: Happily Disgusted, c: Sadly Fearful, d: Sadly Angry, e: Sadly Surprised, f: Sadly Disgusted, g: Fearfully Angry, h: Fearfully Surprised, i: Angrily Surprised, j: Angrily Disgusted, k: Disgustedly Surprised.

Performance decreases substantially when more real-world expressions are included and are significantly lower than results for basic expressions. Compound expressions are more difficult to detect, and more robust methods need to be developed to solve this problem. Compound expressions are less represented in the RAFDB dataset with only 3, 954 images in total. Compound expressions from real-world images are another major challenge.

DCNN models may also be applied to many visual recognition tasks and have performed remarkably well using large sets of training samples. However, on FER tasks, DCNN models are very easy to be overfitted due to a lack of insufficient training data. SqueezExpNet was compared with DCNN models using compound expressions (Table 4).

on the unlearned features used in the baseline system by a significant margin. This also indicates that the SqueezExpNet deep learning architecture is more robust and applicable for basic and compound expression classification.

A cross dataset study, where one dataset of images is used for training and another for testing, was performed to explore specific differences between the lab-controlled faces guided by psychologists and real-word expressions using the same architecture as described in FIG. 2. The same network architecture as an expression recognition task was used for this task. Table 5 shows the performance of facial expression on each database in the cross-dataset study. The F-score is defined as (2*Recall*Precision)/(Recall+Precision).

TABLE 4

Expression performance of different deep neural networks on basic and compound expression categories. The metric is the mean diagonal value of the confusion matrix.

| | | Basic | | | | | | | | Compound |
|---|---|---|---|---|---|---|---|---|---|---|
| | | Anger | Disgust | Fear | Happy | Neutral | Sad | Surprise | Average† | Accuracy |
| CFEE | AlexNet (Krizhevsky et al. 2017) | 61.52 | 56.94 | 44.64 | 67.19 | 51.47 | 70.2 | 67.11 | 59.01 | 63.26 |
| | ResNet-50 (He et al. 2016) | 75.89 | 78.19 | 69.73 | 79.19 | 79.65 | 80.64 | 84.67 | 78.28 | 58.22 |
| | RAN (Wang et al. 2020) | 45.75 | 60.91 | 16.06 | 57.71 | 61.91 | 47.39 | 67.08 | 50.97 | 72.74 |
| | JFDNN (Jung et al. 2015) | 56.04 | 59.52 | 64.48 | 79.64 | 44.97 | 65.47 | 77.9 | 64.00 | 59.50 |
| | SqueezeNet (Iandola et al. 2016) | 77.62 | 79.48 | 80.52 | 89.93 | 80.25 | 76.59 | 87.92 | 81.76 | 78.69 |
| | SqueezeExpNet (our) | 89.54 | 76.63 | 82.17 | 92.50 | 88.7 | 84.13 | 90.51 | 86.31 | 89.09 |
| RAFDB | AlexNet (Krizhevsky et al. 2017) | 48.14 | 45.58 | 70.6 | 71.94 | 72.81 | 57.37 | 77.40 | 63.41 | 32.12 |
| | ResNet-50 (He et al. 2016) | 36.39 | 45.4 | 50.48 | 53.59 | 41.15 | 35.79 | 54.32 | 45.3 | 29.33 |
| | RAN (Wang et al. 2020) | 33.60 | 26.66 | 47.16 | 45.93 | 59.67 | 41.05 | 51.8 | 43.70 | 40.19 |
| | JFDNN (Jung et al. 2015) | 64.58 | 55.67 | 47.69 | 59.83 | 44.64 | 48.1 | 69.63 | 55.73 | 41.61 |
| | SqueezeNet (Iandola et al. 2016) | 45.52 | 37.26 | 62.24 | 69.42 | 52.38 | 38.61 | 70.99 | 53.77 | 27.55 |
| | SqueezeExpNet (our) | 69.48 | 68.61 | 47.53 | 75.28 | 75.62 | 73.82 | 74.6 | 69.28 | 71.10 |

†The mean diagonal value of confusion matrix

Most frameworks employed for FER, such as RAN (Wang et al. 2020) and JFDNN (Jung et al. 2015), are based on pre-trained models. AlexNet (Krizhevsky et al. 2017), ResNet-50 (He et al. 2016) and SqueezeNet (Iandola et al. 2016) were initially designed for ImageNet, a database of thousands of objects that is not well suited to expression characteristics. Therefore, SqueezExpNet was trained on a different dataset like controlled, posed and uncontrolled facial expression data. The performance of SqueezExpNet improved by 2.51% and 1.82% for the CFEE and RAFDB datasets by adding basic expression classes to the compound expressions.

Table 4 shows the performance of expression recognition of different DCNN's on CFEE and RAFDB datasets. The metric is the mean diagonal value of the confusion matrix for the basic and compound expressions. From the results, we have the following observations. First, DCNN's, which achieve reasonable results for large scale images recognition settings, such as the AlexNet network and ResNet-50, are not efficient for facial expression recognition. Second, the SqueezeNet type of architecture's deep features outperform

TABLE 5

| Cross Dataset performance in CFEE, RaFD and RAFDB | | | | | | |
|---|---|---|---|---|---|---|
| Train | CFEE | | RaFD | | RAF-DB | |
| Test | RaFD | RAF-DB | CFEE | RAF-DB | CFEE | RaFD |
| Accuracy | 62.71 | 40.51 | 51.54 | 41.93 | 54.76 | 67.52 |
| F-score | 50.72 | 37.63 | 50.80 | 38.47 | 52.83 | 62.08 |

Example embodiments of the system for determining a facial expression may be advantageous as it presents a SqueezExpNet that extends SqueezeNet architecture for expression classification. The presented squeeze modules are also shallower than the traditional SqueezeNet. The proposed model is feasible for variable poses in a controlled situation and for uncontrolled illumination, poses and occlusions in a real-time FER dataset. The dual-stage feature module is ensembled by a recurrent base classifier to effectively group the geometrical and spatial stages. As compared with similar previous methods, the layer masking mechanism helps the training process capture attention to essential features within the local facial regions. The addition of a 3D face points mask can capture feature maps, extract spatial relations of facial images, and differentiate between critical facial components and other parts of the human face.

Furthermore, the experiments show that 3D landmarks mask mechanism effectively achieves better accuracy for real-time facial expression recognition. Three facial expression databases (CFEE, RaFD and RAFDB) that range from lab posed to uncontrolled images were used for evaluation. SqueezExpNet mechanism offers better results as 3D face points are used as input to the network rather than facial regions, which are less important. The 3D SqueezExpNet is evaluated for basic facial expression recognition and in a cross-database study and consistently outperformed other state-of-the-art methods and offered a general solution for FER.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for determining a facial expression comprising:
    a facial mask generator arranged to detect a plurality of facial points from one or more facial images to generate one or more associated facial point masks, arranged to represent the facial features of an associated face of the one or more facial images; and
    a learning network arranged to receive and input of the one or more facial images and the one or more associated facial point masks to obtain a classification result for each of the one or more facial images, wherein the classification result is one of a plurality of predefined facial expressions,
    wherein the facial point mask is generated by multiplying the plurality of facial points by a plurality of associated weights, wherein the weights are determined based on the position of the pixel of the associate facial image relative to the distances from the facial point mask.

2. A system in accordance with claim 1, further comprising an augmentation processor arranged to augment each of the one or more facial images.

3. A system in accordance with claim 2, wherein the learning network has a squeezenet architecture.

4. A system in accordance with claim 3, wherein the learning network includes a dual stage structure, with each stage having at least one squeeze and expand block.

5. A system in accordance with claim 4, wherein the facial point mask is representative of the 3D geometrical and spatial facial information.

6. A system in accordance with claim 1, wherein the 3D geometrical and spatial facial information is a recurrent input for a classification module of the learning network.

7. A system in accordance with claim 6, wherein the classification module concatenates feature maps outputted by the dual stage structure.

8. A system in accordance with claim 7, wherein the classification ports a probability of each expression with a softmax function.

9. A system in accordance with claim 8, wherein the learning network includes a stem block arranged to downsample the input facial images.

10. A system in accordance with claim 9, further comprising a face extraction processor arranged to extract a facial image from an input image.

11. A method for determining a facial expression comprising the steps of:
    detecting a plurality of facial points from one or more facial images to generate one or more associated facial point masks, arranged to represent the facial features of an associated face of the one or more facial images; and
    inputting into a learning network the one or more facial images and the one or more associated facial point masks to obtain a classification result for each of the one or more facial images, wherein the classification result is one of a plurality of predefined facial expressions,
    wherein the facial point mask is generated by multiplying the plurality of facial points by a plurality of associated weights, wherein the weights are determined based on the position of the pixel of the associate facial image relative to the distances from the facial point mask.

12. A method in accordance with claim 11, further comprising an augmentation process arranged to augment each of the one or more facial images.

13. A method in accordance with claim 12, wherein the learning network has a squeezenet architecture.

14. A method in accordance with claim 13, wherein the learning network includes a dual stage structure, with each stage having at least one squeeze and expand block.

15. A method in accordance with claim 14, wherein the facial point mask is representative of the 3D geometrical and spatial facial information.

16. A method in accordance with claim 11, wherein the 3D geometrical and spatial facial information is a recurrent input for a classification module of the learning network.

17. A method in accordance with claim 16, wherein the classification module concatenates feature maps outputted by the dual stage structure.

18. A method in accordance with claim 17, wherein the classification ports a probability of each expression with a softmax function.

* * * * *